United States Patent
Hickman

[15] 3,692,326
[45] Sept. 19, 1972

[54] FULL AXLE SHEAR RUBBER SPRING SUSPENSION FOR VEHICLES

[72] Inventor: Albert F. Hickman, Eden, N.Y.
[73] Assignee: Hickman Developments, Inc., Eden, N.Y.
[22] Filed: April 13, 1971
[21] Appl. No.: 133,564

[52] U.S. Cl. ............................. 280/124 R, 267/63 A
[51] Int. Cl. ............................................. B60g 11/24
[58] Field of Search ....... 267/21 A, 57.1 A, 63, 63 A; 280/124 R

[56] References Cited

UNITED STATES PATENTS 3,528,680   9/1970   Nelson ................... 280/124 R

Primary Examiner—Philip Goodman
Attorney—Harold I. Popp

[57] ABSTRACT

A full or through axle supported by rubber tired wheels has each end connected through a bearing to one end of a link extending lengthwise of the line of travel. The opposite link end is connected through another bearing to the frame. Each such bearing is constructed, as by inclusion of a flexible rubber bushing, to permit oscillation of the parts connected thereby about its center. Axial movement of the axle laterally of the line of travel is inhibited by rectilinear upright movement shear rubber bodies between the links and frame, these bodies being mounted for this purpose so that their faces fixed, respectively, to their links and the frame, are generally parallel with the line of travel and are upright. These bodies have the added function of providing the resilient support for the frame on the links.

6 Claims, 6 Drawing Figures

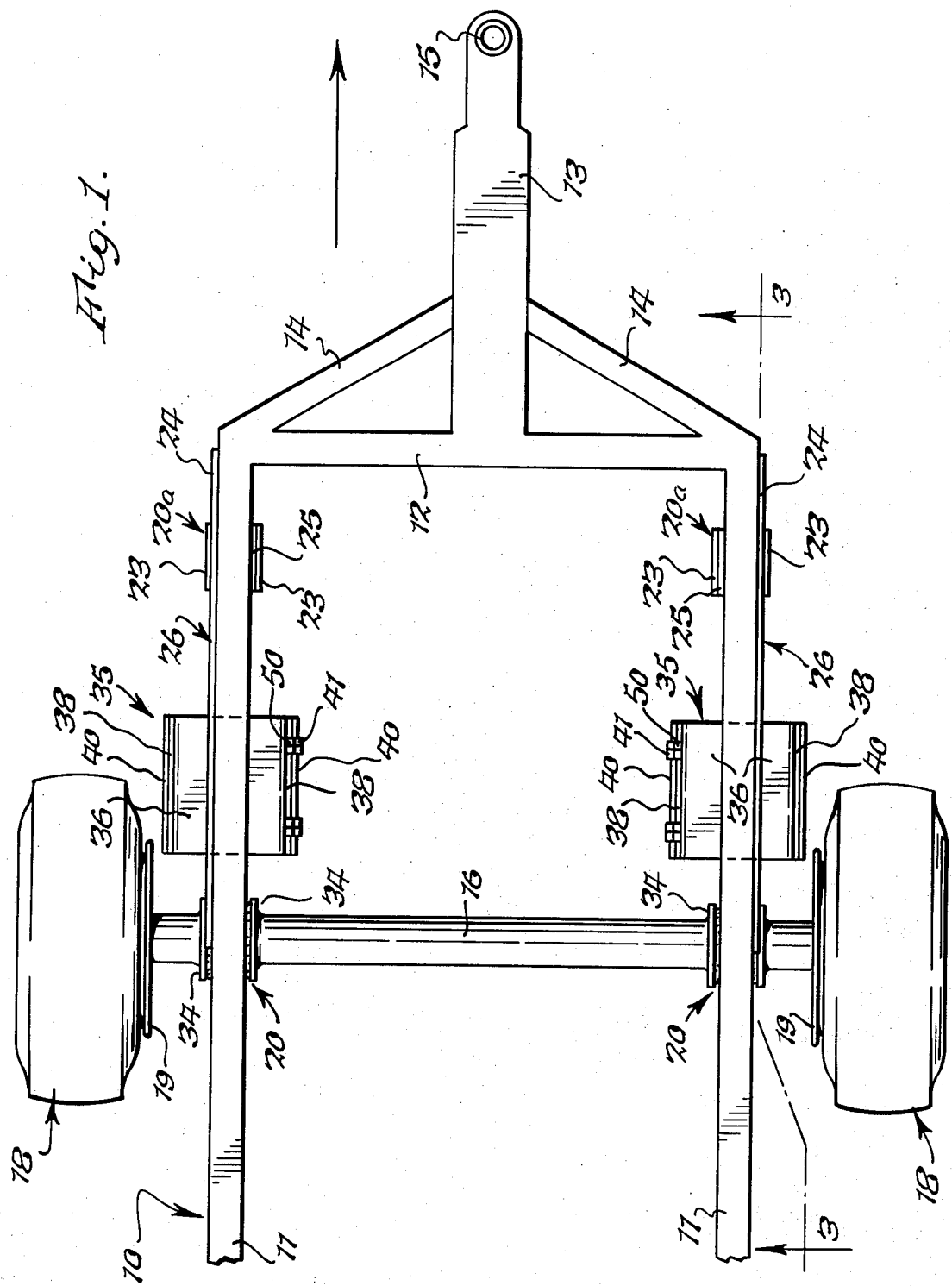

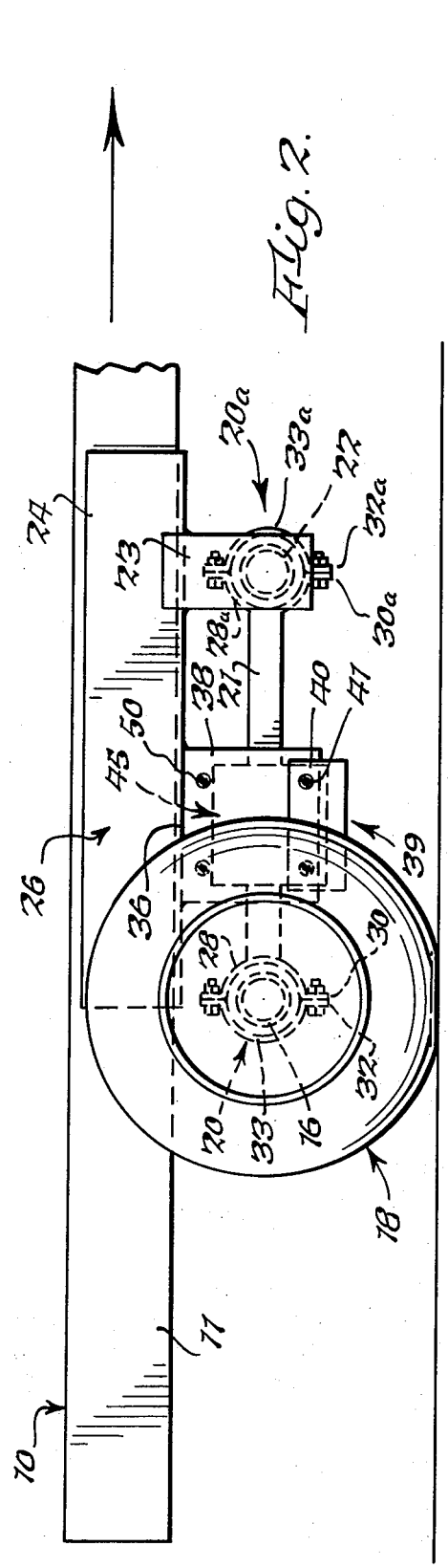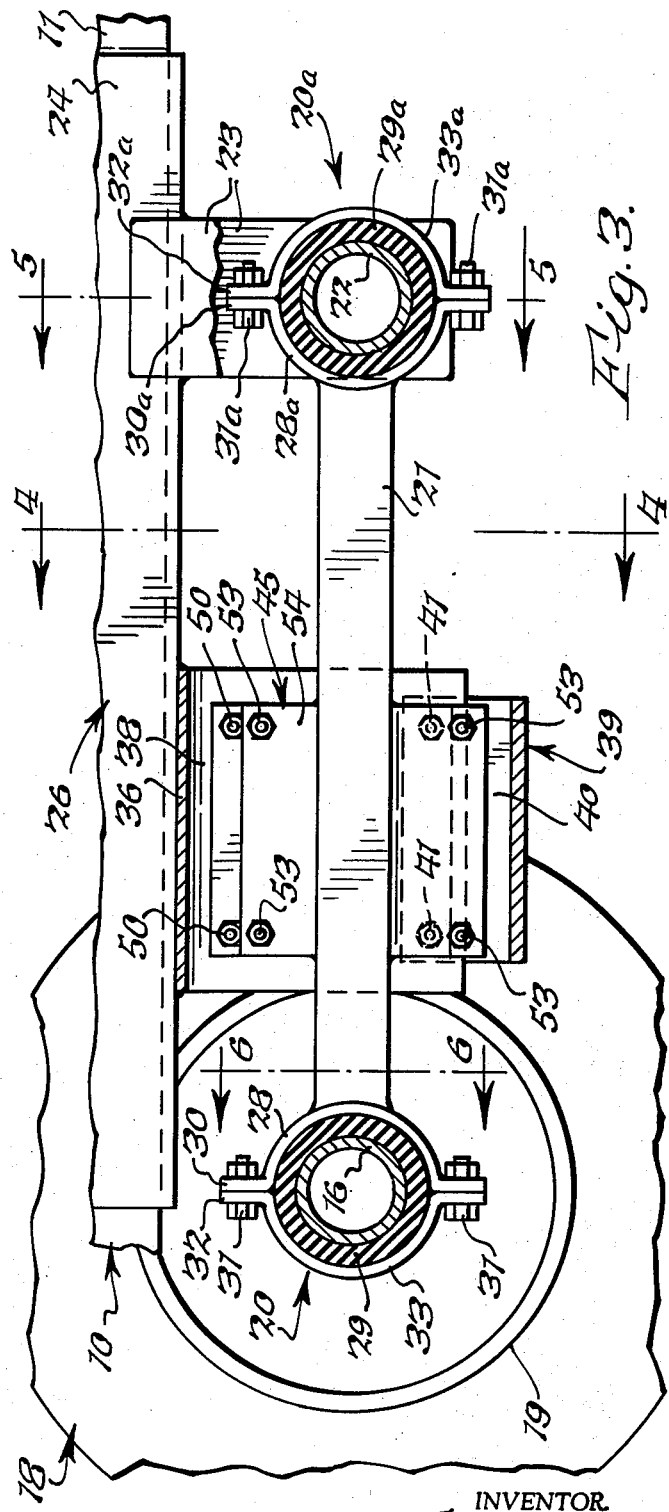

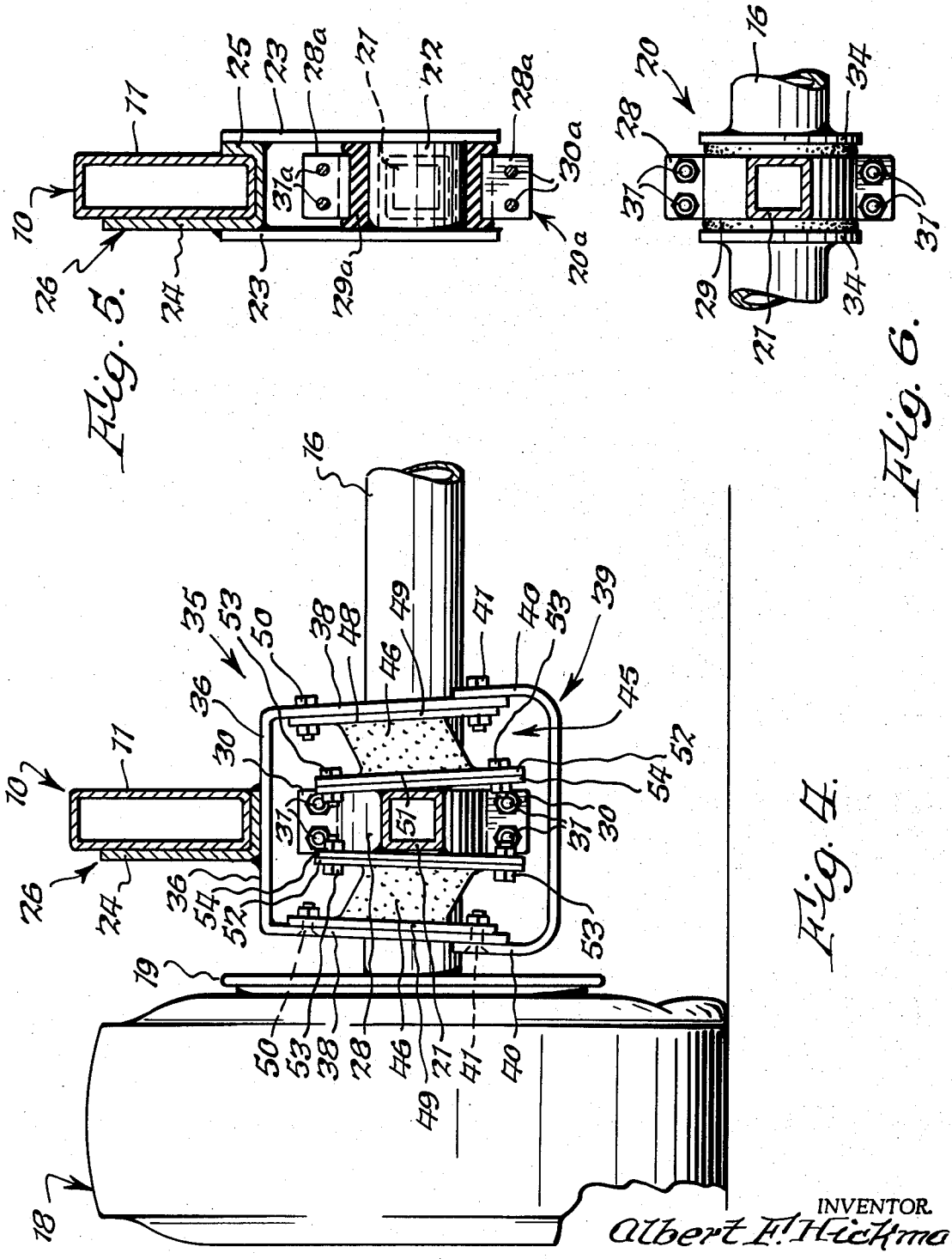

FULL AXLE SHEAR RUBBER SPRING SUSPENSION FOR VEHICLES

An object of the invention is to provide a full or through axle suspension which is low in cost and at the same time provides adaquate resilient support for the frame with either wheel capable of vertical movement relative to the other wheel.

Another object is to provide a suspension which is free from friction and will not require repairs, barring accident, for the life of the vehicle.

Another object is to provide a simple and inexpensive suspension in which axial axle movement laterally of the frame is adaquately controlled by a simple means which also provides substantially the entire resilient support for the frame on the wheels.

Other objects and advantages will be apparent from the following description and drawings in which:

FIG. 1 is a top plan view of a vehicle frame supported at each side by a spring suspension embodying the present invention.

FIG. 2 is a fragmentary side elevational view thereof.

FIG. 3 is an enlarged fragmentary vertical section taken generally on line 3—3, FIG. 1.

FIGS. 4, 5 and 6 are fragmentary sections taken on the correspondingly numbered lines, FIG. 3.

The frame can be of any suitable construction and is shown as a trailer frame 10 comprising a pair of main longitudinal horizontal side beams 11 connected by cross bars 12, and as having a tongue 13 projecting forwardly from the center of the front cross bar 12 and reinforced by diagonal frame bars 14. Any suitable means 15 can be provided at the front end of the tongue for attaching to the rear of the towing vehicle (not shown).

The entire vehicle frame, together with the present spring suspension, is constructed substantially symmetrically about a vertical longitudinal medial plane.

The vehicle frame is supported by a single continuous axle beam 16 extending across and under the frame 10 and the opposite ends of which project outwardly from the opposite sides of the frame. This full or through axle is preferably made of a cylindrical tube and each end thereof so projecting from the side of the vehicle frame 10 is rotatably supported by a rubber tired road engaging wheel 18. These wheels are shown as being braked by a brake mechanism (not shown) within a conventional brake drum 19 associated with each wheel.

Each axle end is connected by an axle bearing 20 to the rear end of a link 21 which can be of any suitable form but is shown as being in the form of a tube which is square or rectangular in cross section and arranged under the corresponding main longitudinal side frame beam 10. The opposite or forward end of each arm 21 is connected by an identical bearing 20a to a horizontal metal sleeve 22, the opposite ends of which are welded to the opposing faces of vertical plates 23 welded at their upper ends to the outside and inside upright flanges 24, 25 of an L-shaped frame bracket 26 which is preferably removably secured, as by bolts (not shown) to the outer vertical face and bottom of each main longitudinal side frame beam 11. The inside upright flange 25 is shown as only being coextensive with the inner plate 23 welded thereto, whereas the outside flange 24 is coextensive with the frame bracket 26 which extends, with reference to the line of vehicle travel, from in advance of the plates 23 to above the full or through axle beam 16. The sleeves 22, and hence the bearings 22a, on opposite sides of the frame are preferably horizontaly axially in line with each other transversely of this line of vehicle travel.

These axle and frame bearings 20, 20a are preferably identical, each having a semicylindrical half bearing metal shell 28, 28a welded at its center to the corresponding end of the arm 21 and embracing a flexible rubber bushing 29, 29a, in turn embracing the corresponding end of the tubular axle 16 and sleeve 22, respectively. Each metal half bearing shell has radially projecting end flanges 30, 30a secured by bolts 31, 31a to similar flanges 32, 32a of a companion metal half bearing shell 33, 33a. The bolts 31 are tightened to draw the metal half bearing shells 28, 33 together and force the rubber bushings 29 into compressive relation with the tubular axle 16, the endwise displacement of the rubber bushings 29 being limited by a pair of spaced abutment rings 34 welded to project radially from each end of the tubular axle 16 on opposite sides of and in spaced relation to the half bearing shells 28, 33, as best shown in FIG. 6. Similarly the bolts 31a are tightened to draw the metal half bearing shells 28a, 33a together and force the rubber bushings 29a into compressive relation with the sleeves 22, the endwise displacement of the rubber bushings 29a being limited by the plates 23 which are in spaced relation to the half bearing shells 28a, 33a, as best shown in FIG. 5.

The rubber bushings 29, 29a of the four bearings 20, 20a must be thick enough to not only permit vertical movement of the rear or free ends of the arms 22 but also to permit the free end of one of these arms to rise while the other falls, as in traveling over a road having a bump engaged by one wheel 18 and a depression encountered by the other wheel. Bearings with rubber bushings of such thickness would also permit parallelogram movement of the axle 16, links 21 and frame 10, that is a movement of the axle 16, axially transversely of the line of vehicle travel. On the other hand, these rubber bushed bearings permit only a very slight movement of the movable suspension parts, that is, the wheels 18, axle 16, links 21 and sleeves 22 lengthwise of the line of vehicle travel. It will be apparent that such response would also be obtained by ordinary ball-and-socket bearings in lieu of the rubber bushed bearings 20, 20a.

The feature of the present invention resides in the use of rectilinear upright movement shear rubber springs for the dual purpose of providing substantially the entire resilient support for the frame 10 on the wheels 18 and also restraining such movement of the axle 16 transversely of the line of vehicle travel. To this end the rectilinear upright movement shear rubber spring means of the present invention are preferably constructed as follows:

The numeral 35 represents an inverted U-shaped frame bracket having an upper cross part 36 welded to the underside of each frame bracket 26 in position to have its depending side legs 38 straddle the central portion of the corresponding lever 21 in spaced relation thereto. The lower ends of each pair of side legs 38 are prevented from spreading apart in service by a U-shaped bottom plate 39 the upright side legs of which are fitted against the remote upright faces of the side legs 38 of each frame bracket 35, the upright legs 40 being secured to the depending legs 38 by bolts 41. Four rectilinear upright movement shear rubber springs 45 are severally interposed between the opposing faces of the depending legs 38 and the corresponding link 21.

Each of these rectilinear upright movement shear rubber springs comprises a yielding rubber body 46 having one upright working face 48 of rectangular shape extending lengthwise of the line of vehicle travel and bonded, as by vulcanization, to a rectangular metal plate 49 secured by the lower corner bolts 41 and by upper corner bolts 50 to one of the opposing faces of the frame bracket depending side legs 38. Each rubber body has another upright rectangular working face 51 parallel with and on the opposite side of each rubber body 46 from its working face 48, each working face 51 being bonded, as by vulcanization, to a rectangular metal plate 52 secured by corner bolts 53 to plates 54 welded to the opposite sides of the corresponding arm 21.

OPERATION

The forward direction of vehicle travel is shown by the large arrows above the right of FIGS. 1 and 2, and in the operation of the suspension, when one wheel encounters a bump in the road, it rises relative to the vehicle frame 10. Such movement is permitted by its link 21 flexing the rubber bushing 24 in which the corresponding end of the axle 16 is journalled, and also flexing the rubber bushing 24a in which the corresponding frame pivot pin 22 is journalled. This pin is rigidly secured to, and hence is in effect an integral part of, the vehicle frame 10. With such movement of one wheel, one end of the through axle 16 rises relative to is other end, this being permitted by the flexing of the four rubber bushings 29, 29a of the bearings 20, 20a. With the rubber bushings 29, 29a thick enough to flex and permit such wheel movement relative to the frame, they would also permit a parallelogram movement of the axle 16, links 21 and vehicle frame 10, this resulting in excessive axial movement of the axle 16 laterally of the line of vehicle travel.

Such excessive lateral movement of the axle 16 is prevented by the rectilinear movement shear rubber bodies 46 flanking the links 21 because their upright working faces 48, 51 are arranged parallel with the line of vehicle travel and hence compressively resist movement of the links 21 (and therefore the axle 16) transversely of the line of travel. In other words, referring to FIG. 4, the resistance of the shear rubber bodies 46 to compression in a horizontal direction transversely of the line of vehicle travel is very high to restrain such lateral axle movement since these rubber bodies are rectilinear movement shear rubber bodies. These rubber bodies 46 serve two important functions, namely, to so prevent excessive axial movement of the axle 16 laterally of the line of vehicle travel and also to resiliently support the vehicle frame on the links.

In this last function, the assumed upward movement of one (or both) wheels and their links 21 about the frame bearing 20a as a fulcrum is transmitted to the corresponding pair of inner center plates 52 of the rectilinear upright movement shear rubber bodies 46.

In their unloaded or undistorted condition, these rubber bodies are in the parallelogram form shown in FIG. 4. With the vehicle loaded, these bodies are distorted so that their working faces 48, 51 and plates 49, 52 are generally in line with one another. With either wheel 18 of the loaded moving vehicle striking a bump in the road, these rubber bodies 46 are further distorted toward a parallelogram condition reverse to that shown in FIG. 4 and with their inner center plates 52 rising above their outer plates 49. Such upward movement of each pair of inner center plates 52 is transmitted through the corresponding pair of rubber bodies 46, outer plates 49, inverted U-shaped bracket 35 and L-shaped frame bracket 26 to the corresponding main longitudinal side frame beam 11 to which the frame bracket 26 is preferably removably secured in any suitable manner.

In the following claims by "rubber" is meant an elastomer such as natural or synthetic rubber or mixtures thereof, and by "wheel" is meant the ground engaging means 18 supporting the stub axles whether in the form of the single wheel shown or in the form of a dual tired wheel.

I claim:

1. A vehicle spring suspension adapted to be interposed between a vehicle frame and a single continuous axle beam extending across and the opposite ends of which project outwardly from opposite sides of said frame, and are supported by rubber tired wheels; wherein the improvement comprises a link interposed between each of said axle beam ends and said frame and extending generally lengthwise of the line of travel of the vehicle, first bearing means severally connecting the adjacent ends of said links to the companion axle beam ends, second bearing means severally connecting the other ends of said links to said frame on a common axis extending transversely of said line of travel, each of said bearing means permitting oscillation of the parts connected thereby about the center thereof in all directions with said first bearing means inhibiting movement of said axle beam lengthwise of said links and with said second bearing means inhibiting movement of the companion ends of said links lengthwise of said line of travel whereby said first and second bearing means permit vertical movement of each axle beam end relative to the vehicle frame and relative to the opposite axle beam end and would also permit axial movement of the axle beam laterally of said line of travel, and means resiliently supporting said frame on said links and also restricting said last mentioned axial movement of the axle beam without preventing such vertical movement of each axle beam end relative to said frame and relative to the opposite axle beam end, comprising a flexible upright rectilinear movement shear rubber body interposed between each side of the vehicle frame and the corresponding link and having opposite upright faces arranged generally parallel with said line of travel, a first plate fast to one of said upright faces, frame bracket means securing said first plate to the corresponding side of said vehicle frame, a second plate fast to the other of said upright faces, and bracket means securing said second plate to the corresponding link whereby vertical movement of one end of said single continuous axle beam relative to its other end effects a correspondingly different oscillation of each of its first and second bearing means about said centers thereof and also effects a corresponding greater upward distortion in shear of the shear rubber body on one side of the frame as compared with the shear rubber body on the other side of the frame, and whereby at least one of said shear rubber bodies compressively resists such axial movement of the axle beam laterally of said line of travel.

2. A vehicle spring suspension as set forth in claim 1 having a pair of such upright rectilinear movement shear rubber bodies, with their first and second plates, at each side of the vehicle frame, the first plate of each body being so secured to the corresponding side of the vehicle frame and the second plate of each body being so secured to the corresponding link.

3. A vehicle spring suspension as set forth in claim 2 wherein the upright rectilinear movement shear rubber bodies of each pair are arranged on opposite sides of their link and are secured to such opposite sides.

4. A vehicle spring suspension as set forth in claim 3 wherein said frame bracket means securing each of said first plates to the corresponding side of the vehicle frame includes an inverted U-shaped bracket, the depending legs of which straddle the companion link.

5. A vehicle spring suspension as set forth in claim 4 additionally having removable means connecting together the lower ends of said depending legs to hold them against spreading.

6. A vehicle spring suspension as set forth in claim 1 wherein each of said first and second bearing means includes a flexible rubber sleeve which is twisted to provide such oscillation in all directions of the parts connected thereby.

* * * * *